United States Patent
Gwon et al.

(10) Patent No.: US 8,712,673 B2
(45) Date of Patent: Apr. 29, 2014

(54) IDLE STOP AND GO SYSTEM AND METHOD FOR CONTROLLING THEREOF

(75) Inventors: Chongah Gwon, Hwaseong-si (KR); Sejun Kim, Seoul (KR); Jiyong Yu, Pocheon-si (KR); Junghwan Bang, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 363 days.

(21) Appl. No.: 13/276,857

(22) Filed: Oct. 19, 2011

(65) Prior Publication Data

US 2012/0138006 A1 Jun. 7, 2012

(30) Foreign Application Priority Data

Dec. 6, 2010 (KR) ......................... 10-2010-0123862

(51) Int. Cl.
*G06F 19/00* (2011.01)
*G06G 7/70* (2006.01)

(52) U.S. Cl.
USPC ........................................ 701/112; 123/179.4

(58) Field of Classification Search
USPC ......... 123/179.1, 179.3, 179.4; 701/102, 112, 701/113; 340/455
See application file for complete search history.

(56) References Cited

U.S. PATENT DOCUMENTS

| | | | |
|---|---|---|---|
| 5,052,531 A | 10/1991 | Bota | |
| 6,275,759 B1 | 8/2001 | Nakajima et al. | |
| 8,392,066 B2 * | 3/2013 | Ehara et al. | 701/41 |
| 8,408,177 B2 * | 4/2013 | Nagoshi et al. | 123/179.4 |
| 2003/0150417 A1 * | 8/2003 | Miwa | 123/179.4 |
| 2004/0231951 A1 | 11/2004 | Hasegawa et al. | |
| 2004/0262995 A1 | 12/2004 | Hawkins | |
| 2005/0140208 A1 | 6/2005 | Ji | |
| 2008/0010001 A1 * | 1/2008 | Lecole et al. | 701/112 |
| 2008/0125944 A1 | 5/2008 | Kamishima et al. | |
| 2009/0071745 A1 * | 3/2009 | Itakura et al. | 180/446 |
| 2011/0046864 A1 * | 2/2011 | Kamiya | 701/102 |
| 2011/0082624 A1 | 4/2011 | Yamamoto | |
| 2011/0160965 A1 * | 6/2011 | Oh | 701/42 |
| 2011/0218699 A1 | 9/2011 | Petzold | |
| 2012/0116657 A1 * | 5/2012 | Kawamoto | 701/113 |

FOREIGN PATENT DOCUMENTS

| | | | |
|---|---|---|---|
| JP | 2000-179389 A | 6/2000 | |
| JP | 2000-274273 A | 10/2000 | |
| JP | 2001-3778 A | 1/2001 | |
| JP | 2001-163087 A | 6/2001 | |

(Continued)

*Primary Examiner* — Stephen K Cronin
*Assistant Examiner* — Joseph Dallo
(74) *Attorney, Agent, or Firm* — Morgan, Lewis & Bockius LLP

(57) ABSTRACT

An ISG system prevents fuel consumption due to unnecessary idling, by controlling the start of an engine, in accordance with engine stop conditions and restart conditions of a vehicle equipped with an automatic transmission. A method includes determining whether prior conditions for engine stop in an engine controller when an engine is in operation is satisfied, determining whether the engine can be stopped, when the prior conditions for engine stop are satisfied, determining whether engine stop conditions is satisfied, when the engine can be stopped, stopping the engine that is in operation, when the engine stop conditions are satisfied, determining whether key start conditions are satisfied, when the engine is stopped, determining whether restart is possible, when the key start conditions are not satisfied, determining whether conditions for restart are satisfied, when restart is possible, and restarting the engine, when the restart conditions are satisfied.

12 Claims, 2 Drawing Sheets

(56) References Cited

FOREIGN PATENT DOCUMENTS

| | | |
|---|---|---|
| JP | 2003-148309 A | 5/2003 |
| JP | 2003-260960 A | 9/2003 |
| JP | 2004-308579 A | 11/2004 |
| JP | 2005-186928 A | 7/2005 |
| JP | 2006-112322 A | 4/2006 |
| JP | 2006-170150 A | 6/2006 |
| JP | 2006-170290 A | 6/2006 |
| JP | 2008-185022 A | 8/2008 |
| JP | 2008-215293 A | 9/2008 |
| JP | 2009-167889 A | 7/2009 |
| JP | 2010-77904 A | 4/2010 |
| JP | 2010-84841 A | 4/2010 |
| KR | 2000-0004073 U | 2/2000 |
| KR | 2002-0008408 A | 1/2002 |
| KR | 10-0897040 B1 | 5/2009 |
| KR | 10-2009-0108422 A | 10/2009 |
| KR | 10-2010-0050786 A | 5/2010 |
| KR | 10-2010-0065885 A | 6/2010 |

* cited by examiner

IDLE STOP AND GO SYSTEM AND METHOD FOR CONTROLLING THEREOF

CROSS-REFERENCE TO RELATED APPLICATIONS

The present application claims priority to Korean Patent Application Number 10-2010-0123862 filed Dec. 6, 2010, the entire contents of which application is incorporated herein for all purposes by this reference.

BACKGROUND OF INVENTION

1. Field of Invention

The present invention relates to an ISG system and a method of controlling the ISG system, and more particularly, to an ISG system that can prevent fuel consumption due to unnecessary idling by controlling start of an engine in accordance with engine stop conditions and restart conditions of a vehicle equipped with an automatic transmission, and a method of controlling the ISG system.

2. Description of Related Art

Recently, various efforts are made to reduce greenhouse gases from vehicles, and as a part of that, various methods are considered to improve fuel efficiency. ISG (Idle Stop and Go) systems are increasingly applied all over the world to improve fuel efficiency. The ISG system prevents fuel consumption by stopping an engine in idling, on the basis of information on vehicle speed, the revolution speed of an engine, and the temperature of cooling water etc.

In other words, the ISG system automatically stops the engine idling, when a vehicle stops due to waiting for the traffic light etc., and after a predetermined time, it restarts the engine in accordance with the requirements of a driver controlling the acceleration and brake pedals. The ISG system can achieve fuel effect of about 5~15% in the actual fuel efficiency mode.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for an ISG system and a method of controlling the ISG system, which can prevent fuel consumption due to unnecessary idling, by controlling the start of an engine, in accordance with engine stop conditions and restart conditions of a vehicle equipped with an automatic transmission.

Further, various aspects of the present invention have been made in an effort to provide an ISG system and a method of controlling the ISG system that can improve the operability even right after the engine is restarted, by keeping the hydraulic pressure of the automatic transmission with a sub-pump when the engine is stopped by ISG system such that sense of difference in restarting the engine is not generated, in accordance with the engine restart conditions Furthermore, various aspects of the present invention have been made in an effort to provide an ISG system and a method of controlling the ISG system that can implement power steering by keeping a motor-driven steering controller operable, when the engine is stopped by the ISG system.

Various aspects of the present invention provide for an ISG system including an engine controller that stops an engine and transmits ISG stop signals to controllers when engine stop conditions for ISG are satisfied, and restart the engine and transmits ISG restart signals to the controllers when engine restart conditions are satisfied, a motor-driven steering controller that allows for power steering even with the engine stopped, by keeping operation of a steering motor, when receiving the ISG stop signal from the engine controller, an automatic transmission controller that controls operation of an oil sub-pump of an automatic transmission to keep hydraulic pressure of the automatic transmission and transmits a shift range of the automatic transmission to the engine controller, when receiving the ISG stop signal from the engine controller, a brake controller that transmits operation of a brake pedal, brake boosting pressure, and vehicle traveling inclination angle to the engine controller, a cluster that shows the ISG operational status transmitted from the engine controller, and transmits signals for whether a hood is open, whether doors of the vehicle are open, and whether seat belts are not fastened to the engine controller, and a battery management system that transmits the charged status of a battery to the engine controller, in which the engine controller controls the operation of the engine in accordance with whether the engine stop conditions and the engine restart conditions are satisfied, in response to the signals from the automatic transmission controller, the brake controller, the cluster, the battery management system, and sensors in the vehicle.

Another exemplary embodiment of the present invention provides a method of controlling an ISG system, the method including determining whether prior conditions for engine stop in an engine controller when an engine is in operation are satisfied, determining whether the engine can be stopped, when the prior conditions for engine stop are satisfied, determining whether engine stop conditions are satisfied, when the engine can be stopped, stopping the engine that is in operation, when the engine stop conditions are satisfied, determining whether key start conditions are satisfied, when the engine is stopped, determining whether restart is possible, when the key start conditions are not satisfied, determining whether conditions for restart are satisfied, when restart is possible, and restarting the engine, when the restart conditions are satisfied.

According to various aspects of the present invention, it is possible to prevent fuel consumption due to unnecessary idling, by controlling the start of an engine, in accordance with engine stop conditions and restart conditions of a vehicle equipped with an automatic transmission.

Further, according to various aspects of the present invention, it is possible to improve the operability even right after the engine is restarted, by keeping the hydraulic pressure of the automatic transmission with a sub-pump when the engine is stopped by ISG system such that sense of difference in restarting the engine is not generated, in accordance with the engine restart conditions.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
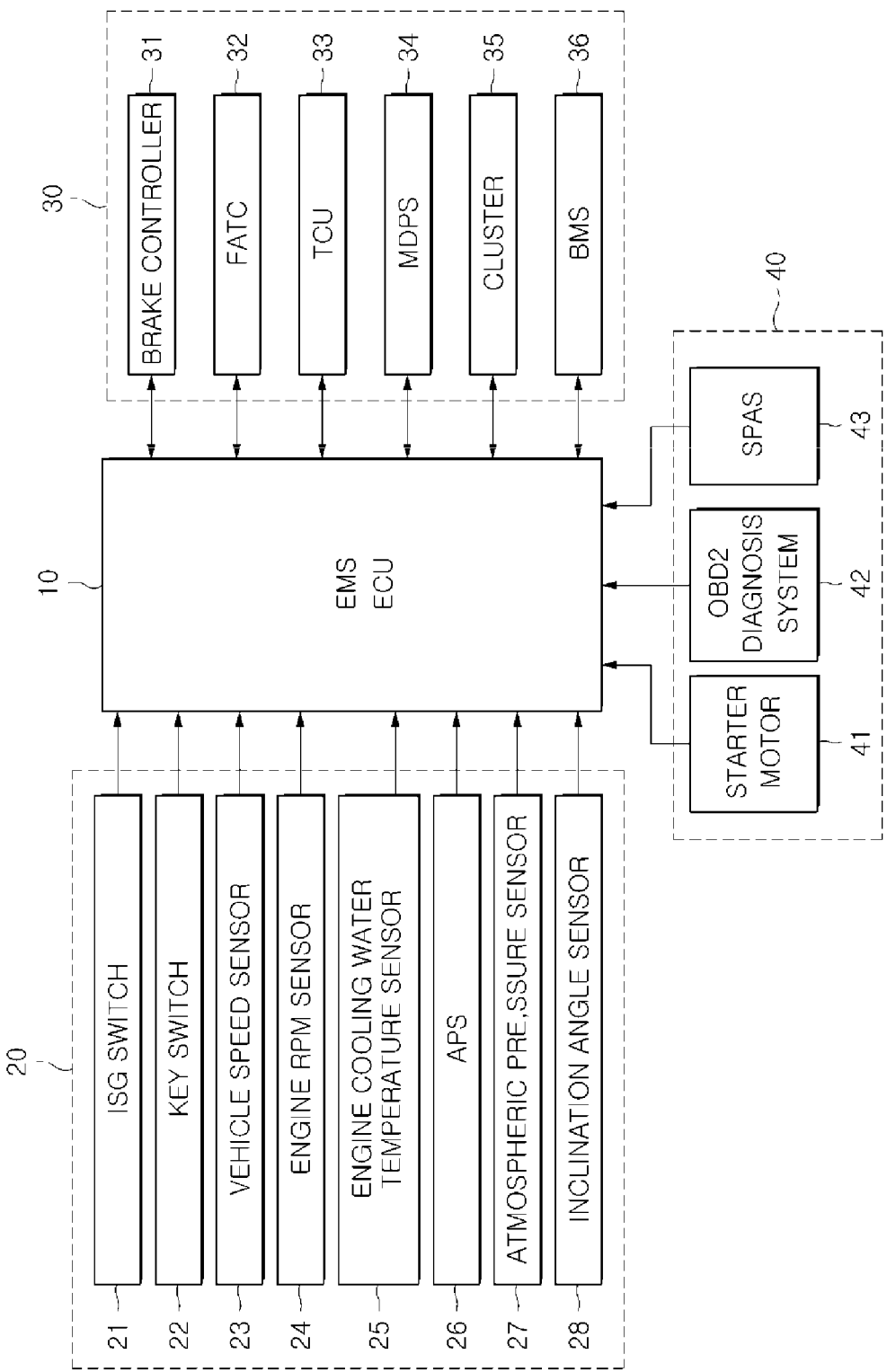
FIG. 1 is a diagram illustrating the structure of an exemplary ISG system for controlling ISG according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only various embodiments, but also various alternatives, modifications, equivalents and other embodiments, which may be included within the spirit and scope of the invention as defined by the appended claims.

Figure 2:
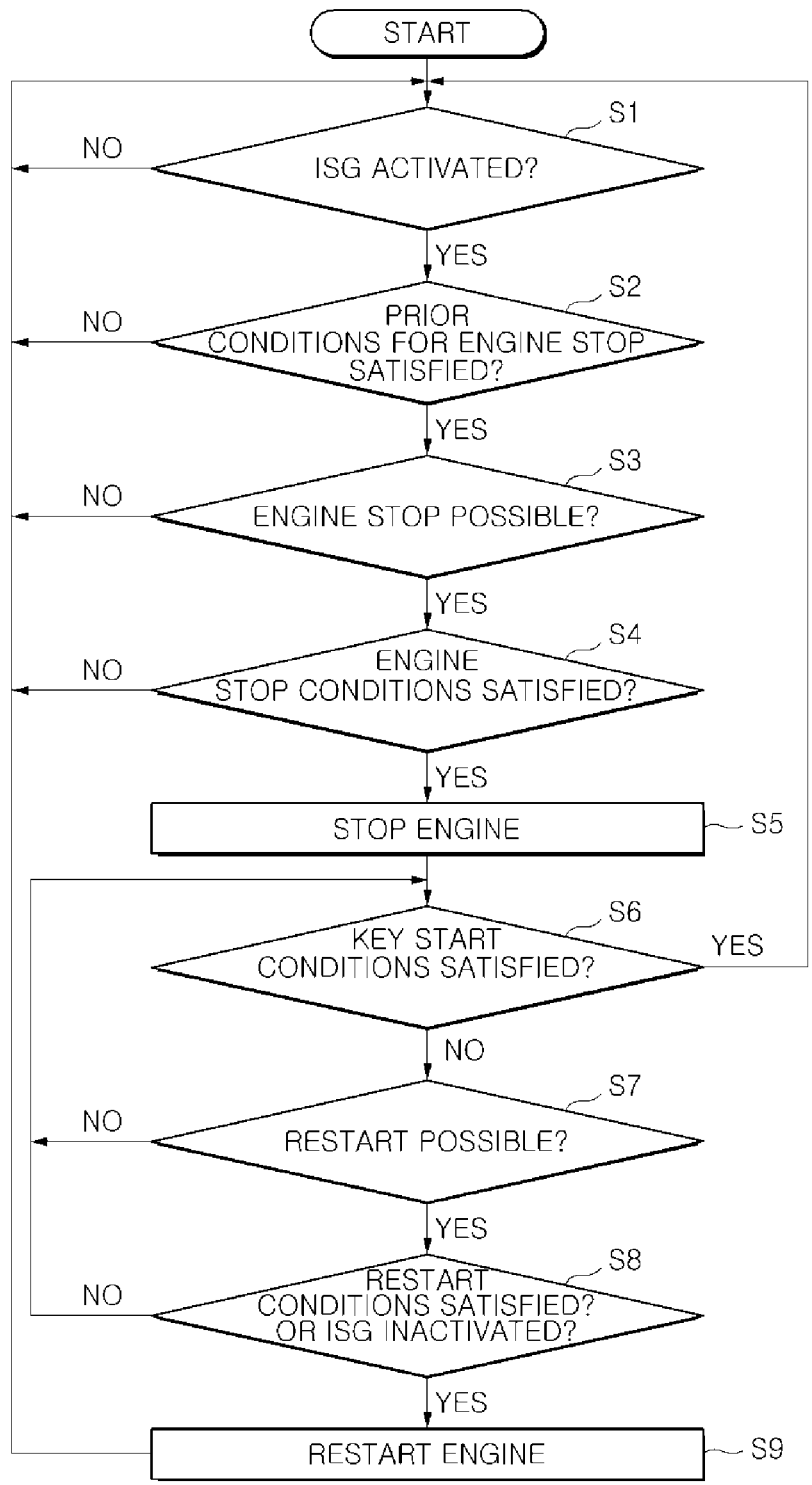
FIG. 2 is a flowchart illustrating an exemplary method of controlling the ISG system shown in FIG. 1.

Referring to FIGS. 1 and 2, an ISG system includes an engine controller 10 that controls an ISG of an engine in response to a signal for the operational status of a vehicle, an sensor unit 20 that transmits signals for the operational status of the vehicle measured by sensors to engine controller 10, and controllers 30 that transmit signals for the operational status of the parts in the vehicle to engine controller 10 and receive signals for the operational status of the engine transmitted from engine controller 10. Further, engine controller 10 can transmit/receive signals from driving parts 40.

Further, a motor-driven steering controller 34 is controlled to be able to implement power steering even if the engine stops, by keep a steering motor operating, even if it receives an ISG stop signal transmitted from engine controller 10. Further, automatic transmission controller 33 can improve operability in engine restart by keeping the hydraulic pressure of an automatic transmission even while the engine stops by ISG, by operating an oil sub-pump of the automatic transmission, even if it receives an ISG stop signal transmitted from engine controller 10. Further, a cluster 35 can inform a driver that the engine is started or stopped by ISG. Further, cluster 35 can show whether the engine can be started, engine stop conditions, restart conditions, and whether the engine can be restarted.

Engine controller 10 checks whether ISG activation conditions are satisfied, on the basis of the signal received by an ISG switch 21 (S1). Engine controller 10 determines that the ISG activation condition when the engine operates is satisfied, when ISG switch 21 is kept on and the ISG system normally operates, with the engine in operation. Further, engine controller 10 determines that the ISG activation condition when the engine stops is satisfied, when ISG switch 21 is kept on with the engine stopped.

Further, when the ISG activation conditions are satisfied, engine controller 10 checks whether prior conditions for engine stop are satisfied, on the basis of the signals transmitted from sensor unit 20 and controllers 30, when engine is in operation (S2). The prior conditions for engine stop and factors for receiving signals for the conditions are those in Table 1.

TABLE 1

Prior conditions for Engine Stop

1. Key switch 22, Cooling water temperature sensor 25: Temperature of cooling water above a predetermined level, after engine is started by key-on
2. Automatic transmission controller 33; Transmission oil temperature within a predetermined range
3. Engine RPM sensor 24; Engine RPM under a predetermined RPM
4. Vehicle speed sensor 23: Maximum traveling vehicle speed above a predetermined vehicle speed after engine restarted
5. Acceleration pedal sensor 26; acceleration pedal off
6. Vehicle speed sensor 23; Vehicle speed 0 Kph
7. Engine controller 10; Predetermined time passed after vehicle is restarted Engine controller 10 determines that the prior conditions for engine stop are satisfied, when the prior conditions for engine stop are all satisfied, within a predetermined time. Although the predetermined time may be set to about 1 to 5 seconds, it is not limited in the present invention.

The predetermined temperature for the cooling water temperature may be set to 65 degrees C. The predetermined temperature for the temperature range of the transmission oil may be set to 35 to 120 degrees C. The predetermined RPM for the engine RPM may be set to 1200 rpm. The predetermined vehicle speed for the maximum traveling speed may be set to 8 km/h. The predetermined time when a predetermined time passed after restart may be set to 5 seconds. The reference values may be changed in accordance with the status of a vehicle.

Engine controller 10 checks whether the engine can be stopped, on the basis of the signals transmitted from sensor unit 20, controllers 30, and driving parts 40, when the prior conditions for engine step are satisfied (S3). Engine controller 10 determines that the engine cannot be stopped, when the current status is not included in engine stop prohibition conditions described in Table 2, and prohibits engine stop, when at least one of the engine stop prohibition conditions is satisfied.

TABLE 2

Engine Stop Prohibition Condition

1. Cluster 35: At least on of hood, driver's door, and seat belt open
2. Battery management system 36: Vehicle battery unsatisfactorily charged
3. Air conditioning system 32: Prohibition of engine stop asked
4. OBD2 diagnosis system 42: Prohibition of engine stop asked
5. Motor-driven steering controller 34: Steering angle above a predetermined angle
6. Fully automatic parking system 43: Fully automatic parking system activated
7. Brake controller 31: Within predetermined time after brake system (ABS, TCS, ESC, DBC) activated
8. Transmission controller 33: Within predetermined time after gear is shifted to R-stage
9. Brake controller 31: Malfunction of hill-start assist control (HAC)
10. Shift controller 33: Shift controller conditions not satisfied
11. Brake controller 31: Brake boosting pressure under reference level
12. Vehicle speed sensor 23; Vehicle speed rapidly decreased (rate of change of vehicle speed or rate of change of brake hydraulic pressure above predetermined level)
13. Inclination angle sensor 28; Uphill/downhill inclination angle above predetermined level in traveling
14. Atmospheric pressure sensor 27; Atmospheric pressure less than predetermined level
15. Starter motor 41; Number of operational times of starter motor above predetermined level
16. Engine controller 10; Problem in ISG-relating parts Engine controller 10 prohibits the engine from stopping, even if the engine can be stopped by ISG until the engine stop prohibition conditions are solved if the engine stop prohibition conditions are satisfied.

The battery charged state for determining that the battery is unsatisfactorily charged may be set to 79%. Further, the predetermined angle that is the reference for determining whether the steering angle is excessive may be set to +/−180. The predetermined time after the brake system is activated may be set to 10 seconds. The predetermined time after the gear is shifted to the R-stage may be set to 1 second. The shift controller determines that the conditions are unsatisfactory, when any one of CAN communication error of the shift controller, malfunction of shift controller 33, and a problem in a transmission sub-pump controller. The reference level of the brake boosting pressure may be set to −35 kPa. It is determined that the vehicle speed rapidly decreases, when it is −10 m/s². The predetermined level of the uphill and downhill inclination angle in traveling may be set to −/+12%, respectively. The predetermined level of the atmospheric pressure may be set to 800 kPa. The predetermined level of the number or operational times of the start motor may be set to 350,000 times. The reference values may be changed in accordance with the status of a vehicle.

Engine controller 10 determines that the engine can be stopped and checks whether the engine stop conditions are satisfied, on the basis of the signals from controllers 30, when all the engine stop prohibition conditions are not satisfied (S4). Examples of engine stop conditions and factors for transmitting signals for the conditions are those in Table 3.

TABLE 3

Engine Stop Condition

1. Automatic transmission controller 33, brake controller 31; Shift gear at D-state, brake pedal on, and brake hydraulic pressure above a predetermined level
2. Automatic transmission controller 33, brake controller 31; shift gear switched from D-range to N-range and brake pedal on Engine controller 10 determines that the engine stop conditions are satisfied, when at least one of the engine stop conditions is satisfied and a predetermined time has passed. Further, the predetermined lever for determining whether the brake hydraulic pressure is above a predetermined level may be set to 8 bar, but it can be changed in accordance with the status of a vehicle.

Engine controller 10 stops the engine, when the engine stop conditions are satisfied (S5). Further, when engine controller 10 checks whether the engine cannot be restarted by ISG and a key start condition where restart is possible in key-on is satisfied, before determining whether the engine can be restarted by ISG, when the engine stops (S6). That is, engine controller 10 checks whether the key start condition is satisfied, on the basis of the signals from controllers 30 (S6). Examples of key start conditions and factors for transmitting signals for the conditions are those in Table 4.

TABLE 4

Key Start Condition

1. Engine controller 10; Number of times of abnormal engine start above predetermined number of times
2. Cluster 35; Hood open with engine stopped TABLE 4-continued Key Start Condition 3. Brake controller 31; Brake off and safety condition removed, with engine stopped
4. Engine controller 10; Problem in ISG-relating parts, with engine stopped Although the predetermined number of times may be set to one time when the engine fails to be started within two seconds, it is not limited in the present invention.

Engine controller 10 determines that engine restart is impossible by ISG and restart in key-on is possible, when at least one of the key start conditions is satisfied, and restarts the engine when the key is at ON (S9).

Further, engine controller 10 checks whether engine can be restarted by ISG, when all of the key start conditions are not satisfied (S7). Engine controller 10 determines that the engine cannot be restarted for safety, when a predetermined time has passed and the acceleration pedal is ON after the engine stopped. Engine controller 10 determines that the engine can be restarted, if the engine restarts is not impossible.

Engine controller 10 checks whether the condition for restart is satisfied, when determining that the engine can be restarted (S8). Engine controller 10 determines that the conditions for engine restart are satisfied, when at least one of an automatic restart condition, a forcible restart condition, and an ISG inactivation condition is satisfied.

First, examples of automatic restart conditions where restart is implemented by operating the shift gear and the brake pedal by the driver are as those in Table 5. A signal for the shift gear is transmitted from automatic transmission controller 33 to engine controller 10 and a signal for brake pedal and hydraulic pressure is transmitted from brake controller 31 to engine controller 10.

TABLE 5

Automatic Restart Condition

1. Brake hydraulic pressure under predetermined level at D-range
2. Predetermined time passed after switching gear to R-stage
3. Brake off right after switching gear to R-stage
4. Brake on when vehicle stops, from N-stage to P-stage
5. Gear shifted to manual range The predetermined level of the brake hydraulic pressure may be set to a value that is 20% less than the maximum hydraulic pressure. Further, the predetermined time after shifting may be set to 1 second. The reference values may be changed in accordance with the status of a vehicle.

Engine controller 10 restart the engine when determining that at least one of the automatic restart conditions is satisfied (S9). Examples of forcible restart conditions for forcibly restarting the engine are as those in Table 6.

TABLE 6

Forcible Restart Condition

1. Brake controller 31; Brake boosting pressure decreased in stopping engine
2. Vehicle speed sensor 23; Vehicle speed generated in stopping engine
3. Battery management system 36; Batter requiring to be charged
4. Air-conditioning controller 32; Order for operating air-conditioning system generated
5. Inclination angle sensor 28; Inclination angle above predetermined range in stopping engine
6. Brake controller 31; Safety condition removed in stopping engine, with brake on The brake boosting pressure reduced in stopping the engine may be set to 35 kPa. The predetermined range of inclination angle may be set to −16% to +16%. The reference values may be changed in accordance with the status of a vehicle.

Engine controller 10 restart the engine when determining that at least one of the forcible restart conditions is satisfied (S9).

Further, engine controller 10 determines that the ISG inactivation conditions are satisfied, when at least one of that the ISG switch is turned off when the engine is in operation, that the ISG system breaks when the engine is in operation, and that the ISG switch is turned off when the engine is stopped is satisfied. Further, engine controller 10 inactivates the ISG of the engine and restarts the engine, when determining that the ISG inactivation conditions are satisfied (S9).

According to the ISG system and a method of controlling the ISG system, it is possible to prevent fuel consumption due to unnecessary idling, by stopping the engine under predetermined situations, such as stopping the vehicle and waiting the traffic lights, in accordance with the engine stop conditions of the vehicle equipped with an automatic transmission. Further, according to the ISG system and the method of controlling the ISG system, it is possible to keep the operability even right after the engine is restarted, by keeping the hydraulic pressure of the automatic transmission and keeping the steering system operable when the engine is stopped by ISG such that sense of difference in restarting the engine is not generated, in accordance with the engine restart conditions.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An idle-stop-and-go (ISG) system, comprising:
    an engine controller that stops an engine and transmits ISG stop signals to controllers when engine stop conditions for ISG are satisfied, and restarts the engine and transmits ISG restart signals to the controllers when engine restart conditions are satisfied;
    a motor-driven steering controller that allows for power steering even with the engine stopped, by keeping operation of a steering motor, when receiving the ISG stop signal from the engine controller;
    an automatic transmission controller that controls operation of an oil sub-pump of an automatic transmission to keep hydraulic pressure of the automatic transmission and transmits a shift range of the automatic transmission to the engine controller, when receiving the ISG stop signal from the engine controller;
    a brake controller that transmits operation of a brake pedal, brake boosting pressure, and vehicle traveling inclination angle to the engine controller;
    a cluster that shows the ISG operational status transmitted from the engine controller, and transmits signals for whether a hood is open, whether doors of the vehicle are open, and whether seat belts are not fastened to the engine controller; and
    a battery management system that transmits the charged status of a battery to the engine controller;
    wherein the engine controller controls the operation of the engine in accordance with whether the engine stop conditions and the engine restart conditions are satisfied, in response to the signals from the automatic transmission controller, the brake controller, the cluster, the battery management system, and sensors in the vehicle.

2. The ISG system as defined in claim 1, wherein the engine controller checks whether conditions for activating the ISG system, conditions for stopping the engine and prohibiting the engine from stopping when the engine is in operation, conditions for automatic restart, forcible restart, and restart prohibition when the engine is stopped are satisfied, in response to signals received by the automatic transmission controller, the brake controller, the cluster, the battery management system, and sensors in the vehicle.

3. A method of controlling an idle-stop-and-go (ISG) system, the method comprising:
    determining whether prior conditions for engine stop in an engine controller are satisfied when an engine is in operation;
    determining whether the engine can be stopped, when the prior conditions for engine stop are satisfied;
    determining whether engine stop conditions are satisfied, when the engine can be stopped;
    stopping the engine that is in operation, when the engine stop conditions are satisfied;
    determining whether key start conditions are satisfied, when the engine is stopped;
    determining whether restart is possible, when the key start conditions are not satisfied;
    determining whether conditions for restart are satisfied, when restart is possible; and
    restarting the engine, when the restart conditions are satisfied.

4. The method as defined in claim 3, wherein determining that ISG inactivation conditions are satisfied when an ISG switch is turned off or the ISG system breaks is performed before the determining of engine stop prohibition, and determining the engine stop prohibition conditions is performed, when the ISG inactivation conditions are not satisfied.

5. The method as defined in claim 3, wherein prohibiting restart of the engine until the acceleration pedal is off, when a predetermined time has passed after the engine stops, and an acceleration pedal is on, determining whether restart is possible after the acceleration pedal is off are performed, after it is determined that the key start conditions are not satisfied.

6. The method as defined in claim 5, wherein restarting the engine is performed, when the engine has stopped for a predetermined time or less and the acceleration pedal is on, after it is determined that the key start conditions are not satisfied.

7. The method as defined in claim 3, wherein restarting the engine is performed only in a key-on state, when the key start conditions are satisfied.

8. The method as defined in claim 3, wherein the determining of whether the condition for restart are satisfied determines that the conditions for restarting the engine are satisfied, when at least one of automatic restart conditions and forcible restart conditions is satisfied.

9. The method as defined in claim 8, wherein whether the conditions for automatic restart are satisfied is determined as being satisfied, when any one of that brake hydraulic pressure is under a predetermined level with the shift gear at the D-range, that a predetermined time has passed after the shift gear is switched to the R-stage, that a brake is off right after the shift gear is switched to the R-stage, that the brake is on with the shift gear switched to the N-stage and the P-stage while the vehicle stops, and that the shift gear is switched to a manual range, is satisfied.

10. The method as defined in claim 8, wherein whether the forcible restart conditions are satisfied is determined as being satisfied, when any one of that brake boosting pressure decreases in stopping engine, that vehicle speed is generated in stopping engine, that a battery requires to be charged, that an order for operating an air-conditioning system is generated, that an inclination angle exceeds a predetermined range in stopping the engine, and that safety conditions are removed in stopping the engine, with the brake on, is satisfied.

11. The method as defined in claim 3, wherein whether the prior conditions for engine stop are satisfied is determined as being satisfied, when the temperature of cooling water is above predetermined temperature after engine start is finished by key-on, the temperature of transmission oil is within a predetermined range, the engine RPM is under predetermined RPM, the maximum vehicle speed is above predetermined vehicle speed after the engine is restarted, the acceleration pedal is off, the vehicle speed is 0 Kph, and a predetermined time has passed after the vehicle is restarted.

12. An ISG system comprising an engine controller that controls operation of an engine, by using the control method as defined in claim 3.

* * * * *